May 30, 1967 H. E. GATZKE ET AL 3,322,080
METHOD AND APPARATUS FOR HYDRAULIC SEED METERING AND PLANTING
Filed May 19, 1965 2 Sheets-Sheet 1
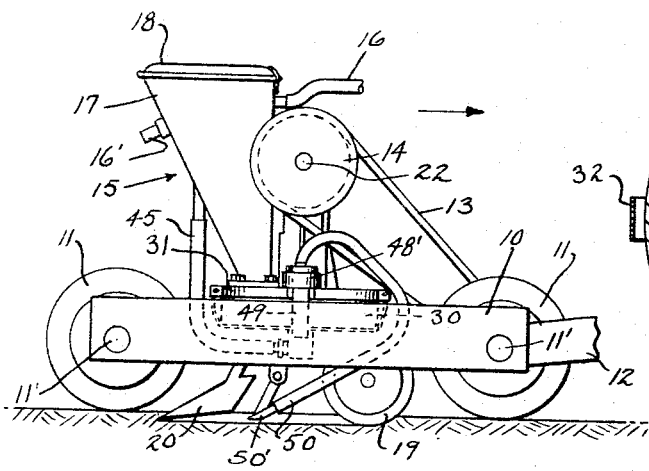
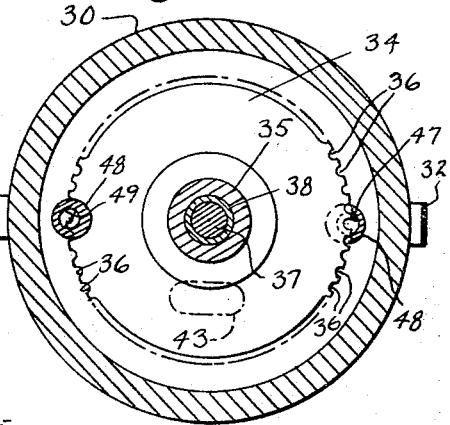
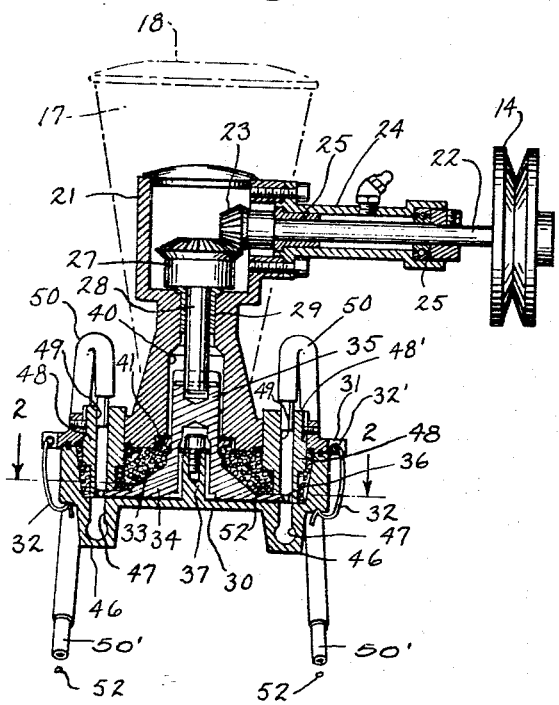
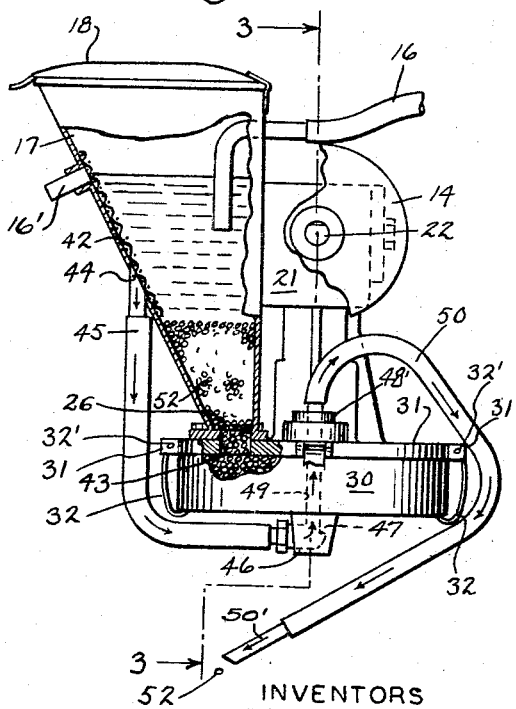
INVENTORS
HAROLD E. GATZKE
MANDO S. ARIENS
VERNON G. DOTY
BY
Wheeler, Wheeler & Wheeler
ATTORNEYS

INVENTORS
HAROLD E. GATZKE
MANDO S. ARIENS
VERNON G. DOTY

BY

Wheeler, Wheeler & Wheeler
ATTORNEYS

United States Patent Office 3,322,080
Patented May 30, 1967

3,322,080
METHOD AND APPARATUS FOR HYDRAULIC SEED METERING AND PLANTING
Harold E. Gatzke, Rte. 1, Berlin, Wis. 54923; Mando S. Ariens, 120 Reid St., West De Pere, Wis. 54178; and Vernon G. Doty, 147 E. Ryan, Brillion, Wis. 54110
Filed May 19, 1965, Ser. No. 456,988
8 Claims. (Cl. 111—1)

This invention relates to a method and apparatus for hydraulic seed metering and planting.

The present invention is intended as a variation of the hydraulic seed-planting devices disclosed in Patents Nos. 3,130,694 and 3,149,582 invented by one of the co-inventors in this application, and which prior patents are intended to be incorporated herein by reference. Primarily, the present invention is designed to provide a novel method and apparatus of the general type disclosed in said prior patents but which is characterized by improved seed metering and seed-ejecting to provide more accurate and reliable metering and planting of individual seeds, or small groups of seeds, in predetermined spaced relationship. The accurately spaced planting substantially reduces the volume of seed required per acre, permits uniform growth of the plants, and greatly facilitates the task of thinning or culling the planted crops.

We accomplish our objectives by immersing in water or other liquid the seed which is to be planted and by metering under water the seed or seeds to be ejected at any given time. Also, we may use a component of the water in which the seeds are immersed to convey the metered seed or seeds to the point of discharge.

The prior patents above identified contemplated an approximation of the correct number of seeds by maintaining the seeds in suspension in water and discharging a specified quantity of water with the seeds suspended therein. Using this practice, one cannot dependably dispense single seeds or even any given number of seeds. Due to the present concept of carrying out the metering operation while the seeds are submerged, we are able to meter the seeds mechanically whether they are hard or soft and whether they are merely superficially wet or whether they are soaked. It is a very important feature of the present invention that the water acts as a lubricant to preclude injury to the seed in the course of the metering operation.

It should be explained that we are using the word "water" generically to include any appropriate liquid vehicle, an aqueous carrier being the most acceptable and readily available and inexpensive example.

By way of illustration, we have shown a number of different metering rotor constructions in a number of different organizations, all of which are designed to effect the desired submerged metering.

With the above and other objects in view, which other objects and advantages of the present invention will become apparent hereinafter, the invention consists of the improved method and machine as illustrated and described, and all of its parts and combinations, and all equivalents thereof.

In the accompanying drawings, wherein there is illustrated one preferred embodiment of the invention and two modified forms thereof, and wherein the same or corresponding reference numerals designate the same parts in all of the views:

FIG. 1 is a side elevational view of the improved planting machine.

FIG. 2 is an enlarged horizontal sectional view through a portion of the planter, taken along line 2—2 of FIG. 3.

FIG. 3 is a vertical sectional view of the planter taken on line 3—3 of FIG. 4.

FIG. 4 is a fragmentary side elevational view of the planter with parts thereof broken away and shown in section.

Figure 5:
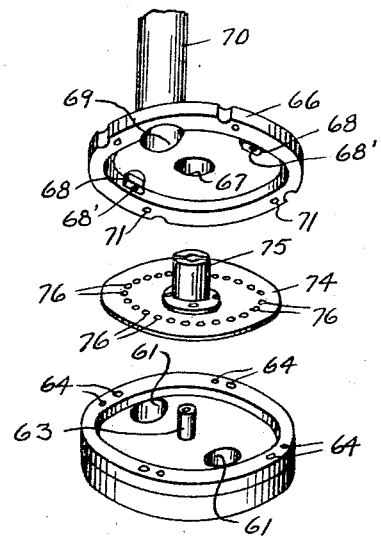
FIG. 5 is an exploded perspective view of a modified form of metering unit which can be employed in accordance with the present invention.

Referring now more particularly to FIG. 1 of the drawings, it will be seen that the improved planter unit 15 comprising the present invention is carried on a frame 10 including wheels 11 and hitch means 12 permitting the same to be connected to the rear of a tractor or other towing vehicle. Said frame also preferably includes a pair of vertically-adjustable parallel furrow-forming wheels 19 and pairs of aligned furrow-closing shoes 20, the design and function of which members is described in detail in said prior Patents 3,130,694 and 3,149,588.

As will be seen in FIG. 4, said planter unit 15 includes a downwardly tapered tank 17 having a removable cover 18 and a bottom opening 26, and intermediate its height said tank is provided with a pair of aligned openings 44, there being screening 42 mounted thereover. In the use of the present planter, said tank 17 is supplied with water from a large mobile container or other source through a hose 16, and a quantity of seeds 52 is deposited in said tank, said seeds tending to settle to the bottom thereof as shown. Preferably, said seeds are allowed to saturate in water before planting in order to commence their germination process, the advantages of which innovation are described in the aforementioned issued patents. Soaking may be effected before the seeds are introduced into the tank or may be carried on directly in the tank in the water in which the seeds are metered, and with a component of which they are discharged for planting. Extending outwardly from the upper portion of said tank 17 is an overflow pipe 16', the function of which will be seen.

Mounted adjacent the water and seed tank 17 is a gear box 21 (FIG. 3) and projecting therein is a horizontal drive shaft 22 having a sheave 14 fast on its outer end. A V-belt 13 (FIG. 1) is trained about said sheave and about a sheave (not shown) carried on one of the planter wheel axles 11', thus providing a drive connection whereby the seed-metering and ejecting mechanism featured in the invention is driven by and synchronized with the planter ground wheels 11 when the machine is in use, as will be hereinafter described in greater detail. As best appears in FIG. 3, said drive shaft 22 is rotatably carried in a sleeve 24, there being suitable bearings 25 and lubricating means therein, and mounted on the inner end of said drive shaft is a beveled gear 23. Said gear meshes with a larger beveled gear 27 on a vertical shaft 28 projecting downwardly in a central bore 40, there being suitable bearings 29 for said driven shaft 28.

Mounted below the water and seed tank 17 and adjacent drive assembly 21 is a cylindrical housing 30. Said housing includes a lower body portion having a pair of diametrically spaced members 46 depending from its under side adjacent its periphery, said members having inlet openings 47 communicating with the housing interior, and connected thereto by means of suitable fittings are hoses 45 leading from the aforementioned openings 44 in the water and seed tank 17 thereabove. Thus water from said tank flows downwardly through said hoses, and the pressure created by said elevated tank functions to urge said water into said bottom openings and upwardly through said housing. As mentioned, an overflow pipe 16' is provided in the upper portion of said tank 17 and as water is continuously introduced into said tank through the inlet hose 16 during operation said overflow pipe functions to maintain a constant water level, thus providing a constant pressure head which causes the water to flow upwardly through said housing at a uniform rate.

Said housing 30 includes a top member 31 having projecting flanges 32' to which are attached spring clips 32 adapted to removably clamp said housing thereto, and said housing top is provided with an opening 43 (FIG. 4) in registration with the tank bottom opening 26, thus permitting the seeds 52 settling in the bottom of said tank to descend into and fill said lower housing 30. Carried on the under side of said cover 31 and depending therefrom to a point spaced immediately above the housing bottom openings 47 are a pair of plug elements 48 (FIG. 3) having vertical bores 49 extending therethrough and opening in the top of said cover. The lower end portions of said plug elements may be provided with arcuate, inwardly-facing cutouts, and the upper ends of said elements preferably project upwardly of the housing top, as designated by the numeral 48'. Coupled to the upper, projecting ends of said plugs are discharge pipes or hoses 50 which are arranged to extend outwardly and downwardly to link-supported nozzles 50' at points immediately above the ground in alignment with furrows formed therein by the wheels 19 (FIG. 1).

Rotatably carried within the housing 30 adjacent the bottom thereof is a rotor, here shown as a horizontal disk 34 (FIG. 3) having an upright stud 35 projecting upwardly through an opening in the housing top and being connected to and for rotation with the aforementioned driven shaft 28, suitable bearings and seal elements 41 being provided in said housing.

With reference now to FIG. 2 of the drawing, it will be seen that the disk 34 is provided with peripheral serrations 36 extending therearound and which are of a size and contour to receive and retain individual seeds, or small groups of seeds, said serrations providing receptacles for said seeds. Said disk 34 is designed to rotatably seat over an axial hub 37 projecting upwardly from the housing bottom, and is fitted closely between said housing bottom and the lower ends or cutout portions of the depending plug elements 48, there being just enough clearance therebetween to permit free rotatable movement of said horizontal disk. As is illustrated in FIG. 2 (which view is taken along the irregular line 2—2 of FIG. 3), said disk serrations 36 are individually successively alignable with the housing bottom openings 47, and with the aligned vertical bores in the plug elements 48 thereabove.

In the operation of the form of the invention illustrated in FIGS. 1–4, when the planter is in use and the rotor disk 34 is rotated, individual seeds 52 among those which pass into the lower housing 30 from the tank 17 are caught and retained in the disc serrations 36, either singly or in small groups, as desired, and rotate with said disk, the relatively confined and restricted design of the housing interior limiting the buoyancy of the lighter seeds. Even seeds which have been greatly softened to the point that germination is in progress can be handled in this rotor because the water acts as a lubricant and protects the seeds from injury and, moreover, because the seeds are so nearly equal in specific gravity to the water that they readily adjust their positions therein to conform as nearly as may be to the shape of the rotor pocket and to the movement of the rotor. Water from the tank 17 is evacuated therefrom through the hoses 45, the screening 42 preventing seeds from entering said hoses, and is directed into the openings 47 in the bottom of the housing, as described. Said water not only functions as a seed-carrier, as already stated, but it acts as a lubricant to prevent friction damage by the rotating disk to the seeds, whether these are still hard or have already been softened and water saturated.

The housing 30 in the present invention is mounted below the supply tank 17, and the pressure created by the water in said elevated tank causes the water introduced into the bottom of said housing to travel upwardly through the vertical bores 49 therein and out the discharge tubes 50. Thus, as the disk 34 rotates, and the seed-carrying serrations 36 therein are successively brought into registry with the housing bottom openings and the vertical plug bores 49 aligned thereabove, the water flowing upwardly through said housing successively engages the seed or seeds carried in each pocket in said metering rotor and carries the same outwardly through the discharge tubes 50. As mentioned, the tank overflow pipe 16' functions to maintain a constant water level and pressure head, with the result that said seeds are discharged at a constant rate.

The disk 34 is designed to closely rotatably fit beneath the plug elements 48, and as said disk moves thereunder during the operation of the present machine said elements function to remove any excess seeds that might be carried in the disk serrations, thus preventing the planting of more than the desired number of seeds in each cycle. At this point, also, the fact that the seeds have nearly the same specific gravity as the water, and are lubricated by the water, tends to protect the seeds against injury.

The discharge tubes 50 are arranged to deposit the water and seeds in furrows formed in the ground, and when the machine is in use the individual seeds or groups of seeds are planted in spaced relationship along the furrows. The spacing between said seeds is determined by the number of serrations and speed of rotation of the metering disk 34 in relation to the ground speed of the machine. Since said disk is drivably connected to the planter ground wheels 11, it can be readily synchronized therewith to provide desired seed spacing. The result is a unique device which permits extremely accurate metering of seeds, even the water softened, tender seeds, thus not only minimizing waste and reducing the volume of seed required per acre, but also promoting faster and more uniform growth and quality of the plants. Moreover, and as is brought out in the aforementioned prior patents granted to one of the co-inventors of the present invention, the deposit of seeds and water into the ground together provides a water supply for the young, growing seeds, which can be of critical importance in many areas of the world.

In the event it is desired to plant another type of seed, of a different size, the housing 30 may be readily detached merely by disengaging the retaining clamps 32, and the rotor disk 34 can then be removed and replaced with a disk having serrations of a size designed to accommodate the particular seeds to be planted.

In the form of the invention illustrated in FIGS. 1–4, it is preferred to arrange the hoses 45 so that water from the tank 17 is directed upwardly through the housing, as shown and described, so that the individual seeds will be lifted upwardly from the seats provided therefor by the disk serrations 36, rather than forcing said tender seeds downwardly through said serrations and possibly damaging the same. However, in some instances it is desirable to arrange said hoses so that the water is directed downwardly through the housing top openings 48' and out the bottom openings 47 in said housing, although the upward delivery is more gentle and is therefore preferred when the seeds are soft. Moreover, while elongated discharge tubes 50 are preferred in order to ensure accurate deposit of the seeds within the ground furrow, said tubes can be eliminated and the seeds dropped directly from the housing if desired.

In addition to the embodiments of the invention hereinabove described, several other variations therein are contemplated, two of which are illustrated in FIGS. 5-8 of the drawings.

Figure 6:
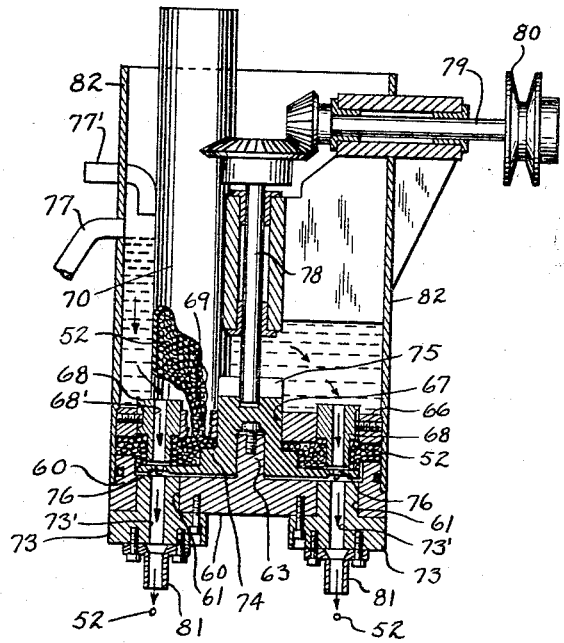
FIG. 6 is a vertical sectional view of a planter incorporating the modified structure of FIG. 5.

In the form of the invention shown in FIGS. 5 and 6, and referring first to FIG. 6, the water tank 82 is cylindrical in form, and a supply pipe 77 and overflow pipe 77' are provided to supply and maintain the water in said tank at a predetermined level. Mounted within the bottom of said tank is a lower cylindrical housing section 60 having an upright axial stud 63, and formed in and through said lower housing are a pair of diametrically spaced openings 61 having plug elements 73 fitted therein and depending below said housing. Said plug elements are provided with vertical bores 73' therethrough, and communicating therewith and extending downwardly from said housing are discharge tubes 81 which are arranged to project downwardly to a point immediately above the ground in alignment with furrows formed therein.

Mounted on the housing section 60 is a concentric upper housing section 66, there being registering peripheral bores or tapped openings 64 and 71 in said sections through which bolts or other retaining means can be projected to removably join said housing sections together. Formed in and through said housing upper section 66 is a seed hole 69, and mounted in said section in diametrically spaced relationship are plug elements 68 having vertical bores 68' therethrough. As appears in FIG. 6, said upper housing plugs are aligned with and depend downwardly to a point spaced immediately above the plug elements 73 in the housing lower section, thus permitting water from the tank 82 to flow into the housing through the upper bores 68' and downwardly and out through said aligned lower plug element bores 73' and attached discharge tubes 81.

Carried within the tank 82 is an elongated cylindrical container 70 into which the seeds 52 to be planted are initially deposited. Said container has an open bottom and is aligned with the aforementioned seed hole 69 in the upper housing section to permit the seeds to descend into and fill the cavity in said housing, as illustrated in FIG. 6.

Rotatably carried within the housing sections 60, 66 is a rotor disk 74 having an upright stud 75 seated over the housing axial stud 63 and projecting upwardly through an opening 67 in said housing top. As is shown in FIG. 6, said disk stud 75 is connected to and for rotation with a shaft 78 drivably coupled to a horizontal drive shaft 79. As in the first described form of the invention, said drive shaft 79 is preferably provided with a sheave 80 for drivably connecting the same to the planter ground wheels, and is synchronized therewith to provide the desired seed spacing.

The rotor 74 is positioned closely between the surface of the lower housing section and the depending upper plug elements 68, there being just enough clearance therebetween to permit the unrestricted rotation of said disk. As best appears in FIG. 5, said disk 74 is provided with a plurality of circumferentially spaced apertures 76 which are of a size and contour to receive and retain individual seeds, or small groups of seeds, from among those descending into the housing from the seed container 70, as described. Said disk apertures are individually successively alignable with the aligned, vertical plug element bores 68' and 73', and when the machine illustrated in FIG. 6 is actuated the water from the tank 82 flowing downwardly through said aligned bores 68', 73' successively engages the seeds contained therein as each aperture rotates into registration with said aligned bores and carries said seeds 52 downwardly therewith and out the discharge tubes 81. These correspond to the tubes 50 shown in FIGS. 1-4, and may be provided with nozzles 50' supported by links as above described. Thus, when the machine is in use said seeds are planted in predetermined spaced relationship in the ground furrows.

Figure 7:
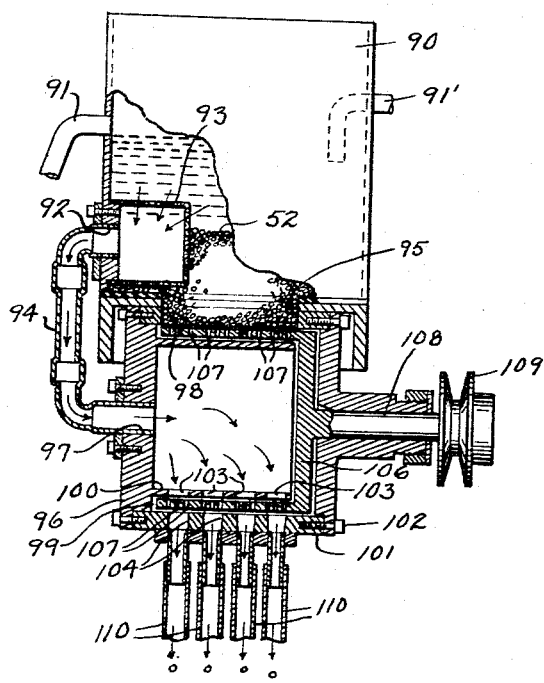
FIG. 7 is a vertical sectional view of another modified form of the invention.
Figure 8:
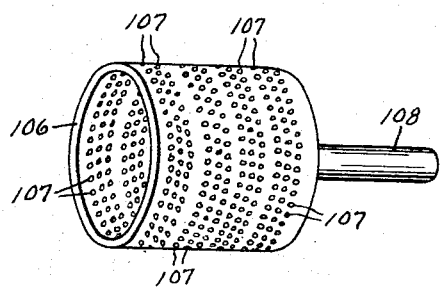
FIG. 8 is a perspective view of the metering device incorporated in the unit illustrated in FIG. 7.

In the form of the invention illustrated in FIGS. 7 and 8, the planter includes a tank 90 (FIG. 7) having a supply pipe 91 and overflow pipe 91' designed to maintain the water therein at a constant level. Formed in the lower end of said tank is an opening 95 through which can pass seeds 52 deposited therein and settling at the tank bottom. Mounted within said tank is a screen 93 covering an opening 92 formed in the tank side wall, and extending downwardly therefrom is a water hose 94.

Positioned on a horizontal axis below the tank 90 is a cylindrical housing 96 having an inner shell 100 and integral concentric outer shell 101, there being an annular space 99 therebetween, and said outer housing shell is provided with a top opening 98 in registration with the opening 95 in the bottom of said water and seed tank. Formed in the lower portion of said housing shells are sets of aligned openings 103 and 104, and mounted on the housing under side in communication with said bottom openings are discharge tubes 110 which preferably extend downwardly to a point spaced immediately above the ground.

Rotatably carried within the annular space 99 between the housing shells 100 and 101 is a drum-shaped rotor 106 (FIG. 8) having a drive shaft 108 projecting from one end thereof, and having a multiplicity of spaced apertures 107 spaced therearound, said apertures being registrable with the aligned sets of bottom openings 103 and 104 in said housing shells. Said apertures 107 are also successively registrable with the outer shell top opening 98 and the aligned tank opening 95, and are of a size and contour to receive and retain individual seeds or groups of seeds from among those descending through said openings from the tank, the concentric housing shells 100 and 101 being adapted to retain the seeds contained in said drum apertures sandwiched therebetween when said seeds are rotated out of registration with said outer shell top opening.

As is shown in FIG. 7, the aforementioned water hose 94 communicating with and extending downwardly from the tank 90 is projected through an opening 97 in the end wall of the housing 96 and extends into the interior of the cylindrical inner shell 100. Thus, water from the tank 90 will flow into the interior of said housing and out through those drum apertures 107 which are in registration with the aligned housing bottom openings 103 and 104, said water then passing downwardly and out through the attached discharge tubes 110.

With reference again to FIG. 7, a sheave 109 is mounted on the outer end of the drum shaft 108, and a V-belt or the like (not shown) may be trained therearound and operatively associated with the planter ground wheels to provide synchronized means for rotating said drum 106 when the machine is in operation. As said drum rotates, the water flowing therethrough from the tank 90 successively engages the seeds contained in said drum apertures 107 as said apertures rotate into registration with the housing bottom openings, and carries the seeds downwardly and outwardly through the discharge tubes 110, said seeds being deposited in spaced relationship in the ground when said mobile planting machine is in use.

As in the other forms of the present invention hereinabove described, with the modified metering rotor illustrated in FIGS. 7 and 8 extremely accurate spacing between groups of seeds can be obtained. Moreover, it is intended to supply rotor drums having various sized apertures therein, thus permitting the removal and replacement of one drum with another when it is desired to plant larger or smaller sized seeds.

From the foregoing detailed description, it will be seen that the present invention provides a novel hydraulic seed planter which is an advancement over the prior machines of the same general type in that even soft seed in process of germination can be metered mechanically without requiring the seed to be kept in suspension in the water as was necessary in the equipment disclosed in the said patents.

The method, which is an important part of this invention, will probably be clear from the foregoing description but will be summarized as follows:

The seed to be planted is introduced into a body of liquid. It may be dry as introduced or may previously have been soaked. It may be introduced immediately prior to planting, in which case, if it was initially dry, it will only be superficially wet when planted. Alternatively, it may be soaked in part of the same liquid to be used in the planting operation as hereinafter described.

The seed introduced into the body of liquid is mechanically metered while completely immersed. The liquid serves as a lubricant which protects the seed from injury during the metering operation. This makes it possible without injury to the seed to segregate one seed or a few seeds, as desired, from the mass of seeds within the liquid. The herein described method permits accurate control of the number of seeds discharged in each operation, being greatly superior in this regard to previously known methods of hydraulic planting.

The seed so segregated is then delivered into a moving stream of water which discharges the metered seed with the small component of water in which it is entrained, discharge taking place into the prepared furrow or seed bed in which the seed is to grow. As in other hydraulic planting operations, the method herein disclosed assures that the soil in which the seed is hydraulically positioned will be moistened by the entraining liquid for continued germination and growth.

Several mechanical embodiments of the present invention have been illustrated and described herein, including three different metering rotors, and arrangements whereby the metered seed is discharged from the metering pocket either upwardly or downwardly, and either by the flow of a component of water segregated from water in which the seed is immersed, or in a component of water separately derived from the source. In any case, the invention is by no means to be limited or confined to devices including the exact designs disclosed herein. It is contemplated that numerous changes coud be made in many of the structural details while still incorporating the basic novelty of the invention, and it is therefore intended to cover herein not only the illustrated forms of the present invention, but also any and all variations or modifications thereof as may come within the spirit of said invention, and within the scope of the following claims.

We claim:

1. A method of hydraulically planting seed, said method comprising the steps of opening a furrow to receive seed for planting, commingling a body of liquid with a substantial quantity of the seed to be planted, periodically segregating below the level of said liquid the seed for a single planting operation, discharging liquid into said furrow, and in the course of discharging said last mentioned liquid introducing and entraining in said last mentioned liquid the previously segregated seed for discharge into the furrow with said last mentioned liquid, advancing along said furrow the point of delivery of said flow of liquid thereto, and thereby discharging into said furrow at spaced intervals the seed so segregated together with a component of said liquid, the seed being protected by the liquid from injury during the segregating and seed discharging steps.

2. A method according to claim 1 in which the flow of liquid and the rate of advance of the point of liquid delivery along the furrows are substantially constant, whereby the intervals between discharging of seed into the furrow are substantially uniform.

3. A method according to claim 1 in which the liquid comprises water and the seed is soaked in water preliminary to the segregation from said quantity of seed of the seed for each single planting operation, the seed commingled with said body of liquid being a sufficient amount of seed for a large number of planting operations.

4. In a seed planter of a type adapted to advance along a furrow for delivering into the furrow individual plantings of segregated seeds in mutually spaced increments and in a convection current of water, a metering device comprising:
    (a) means including a water line and a source of water for establising a flow of water through said line,
    (b) a water-containing metering chamber in which substantial quantities of the seeds to be planted are commingled with water,
    (c) a rotor having a peripheral portion exposed to the seeds in said chamber and having in said peripheral portion successive pockets each adapted when exposed in said chamber to receive seed for a single planting, and to segregate such seed from other seed in said chamber,
    (d) means for rotating the rotor,
    (e) said chamber having means lubricated by the water for wiping excess seed from the rotor to leave only a metered quantity of seed in each such pocket,
    (f) said chamber having spaced ports in series in said line and with which the successive cavities register in the course of rotor rotation for delivery of metered seed from successive cavities into the flow of water in said line and entrainment of said seed in mutually spaced components of the water flow transversing said line.

5. A metering device according to claim 4 in which said chamber communicates with the source of water and has means providing a lower port and an upper port which constitute the said spaced ports with which successive cavities register, the water line having a portion leading from said source to said lower port and having another portion leading from the upper port and provided with a discharge nozzle for water traversing the line and seed entrained therein.

6. A metering device according to claim 4 in which the source of water comprises a tank for water and seeds and having a bottom opening, said chamber comprising a generally cylindrical housing mounted below the tank on a horizontal axis, said housing having an outer shell and an inner shell with an annular space therebetween with which one of said spaced ports communicates to put said chamber in said line, said rotor comprising a cylindrical drum rotatably mounted and disposed within the annular space between the housing shells, said pockets comprising apertures spaced on the periphery of the drum and of a size and contour to receive and retain seed received into said housing through said one port from said tank, the other said port comprising aligned bottom openings in said shells with which the drum apertures register in the course of drum rotation.

7. A metering device according to claim 4 in which said rotor is mounted for rotation on a vertical axis, the means for wiping excess seed from the rotor comprising a tubular plug in said line and extending into the rotor and having at its end one of the said spaced ports in said line.

8. A metering device according to claim 4 in which said metering chamber is in a lower portion of a tank which constitutes said source, separate means leading into said metering chamber for delivering seed thereto, said water line including a tubular plug providing communication between the tank and the metering chamber and having a terminal portion in immediate proximity to the rotor and constituting the aforesaid means for wiping excess seed from the rotor.

References Cited
UNITED STATES PATENTS

| | | | |
|---|---|---|---|
| 2,479,534 | 8/1949 | Bergh | 111—34 X |
| 2,682,428 | 6/1954 | Roberts | 239—311 |
| 2,732,975 | 1/1956 | Blazer | 221—234 |
| 3,130,694 | 4/1964 | Gatzke | 111—7 |

ABRAHAM G. STONE, *Primary Examiner.*

ROBERT E. BAGWILL, *Examiner.*